United States Patent [19]

Seto et al.

[11] Patent Number: 5,365,599
[45] Date of Patent: Nov. 15, 1994

[54] METHOD AND SYSTEM OF CONVERTING DELINEATIVE PATTERN

[75] Inventors: Kunio Seto, Tokyo; Kensaku Tanaka, Yokohama; Yukari Taniguchi; Takahiro Kato, both of Tokyo, all of Japan

[73] Assignee: Canon Kabushiki Kaisha, Tokyo, Japan

[21] Appl. No.: 173,868

[22] Filed: Dec. 23, 1993

Related U.S. Application Data

[63] Continuation of Ser. No. 94,924, Jul. 22, 1993, abandoned, which is a continuation of Ser. No. 690,398, Apr. 25, 1991, abandoned, which is a continuation of Ser. No. 569,737, Aug. 22, 1990, abandoned, which is a continuation of Ser. No. 336,514, Apr. 11, 1989, abandoned, which is a continuation of Ser. No. 914,733, Oct. 2, 1986, abandoned.

[30] Foreign Application Priority Data

Oct. 7, 1985 [JP] Japan ................... 60-222937

[51] Int. Cl.$^5$ .............................. G06K 9/48
[52] U.S. Cl. ......................... 382/22; 382/47
[58] Field of Search ............ 382/22, 47, 44, 46; 740/731; 358/287; 364/723

[56] References Cited

U.S. PATENT DOCUMENTS

| | | |
|---|---|---|
| Re. 30,679 | 7/1981 | Evans et al. |
| 4,087,788 | 5/1978 | Johannesson . |
| 4,199,815 | 4/1980 | Kyte et al. |
| 4,331,955 | 5/1982 | Hansen . |
| 4,566,128 | 1/1986 | Araki . |
| 4,618,991 | 10/1986 | Tabata et al. |
| 4,636,870 | 1/1987 | Yamada et al. ............ 358/288 |
| 4,654,651 | 3/1987 | Kishi et al. ............ 340/731 |
| 4,817,172 | 3/1989 | Cho . |

FOREIGN PATENT DOCUMENTS

| | | |
|---|---|---|
| 2550360 | 2/1985 | France . |
| 1524345 | 8/1970 | Germany . |
| 2919013 | 12/1979 | Germany . |
| 3326725 | 3/1984 | Germany . |
| 5315624 | 12/1974 | Japan . |
| 5341017 | 2/1975 | Japan . |
| 59-022160 | 5/1984 | Japan . |
| 2131660 | 6/1984 | United Kingdom . |

OTHER PUBLICATIONS

IEEE Transactions on Computers, vol. C-24, No. 10, Oct. 1975, pp. 983-988; A. K. Agrawala: "On Generating Line 'Parallel' to a Digital Line-A Sequential Approach".

IEEE International Conference on Acoustics, Speech and Signal Processing, May 3-5, 1982, vol. 3, pp. 1920-1923, J. P. Gambotto: "Algorithms for Region Description and Modifications Based on Chain Code Transformations".

G. Hegron: "Synthése d'Image: Algorithmes Elementaires", Bordas, Paris, 1985, pp. 63-98, 166-169, 179-182.

Patent Abstracts of Japan, Apr. 22, 1980, vol. 8, No. 113; Japanese Kokai 59-22160, Nagata et al.

IEEE Transactions on Computers, vol. 24, No. 10, pp. 983-988, "On Generating a Line 'Parallel' to a Digital Line—A Sequential Approach", Agrawala.

IEEE International Conference on Acoustics, Speech and Signal Processing, vol. 3, pp. 1920-1923, "Algorithms for Region Description and Modifications Based on Chain Code Transformations", Gambotto.

*Primary Examiner*—Lincoln Donovan
*Attorney, Agent, or Firm*—Fitzpatrick, Cella, Harper & Scinto

[57] ABSTRACT

A pattern conversion method and apparatus including a storage unit for storing data representative of the contour of a pattern, a readout unit for reading the data from the storing unit; and a processing unit for processing the data read from the storage unit and representative of the contour of the pattern, wherein the processing by the processing unit comprises the steps of: parallel moving each of a plurality of segments constituting the contour of the pattern by the same distance d; solving for an intersection between the moved segments; and repeating the steps for the entire contour of the pattern.

106 Claims, 3 Drawing Sheets

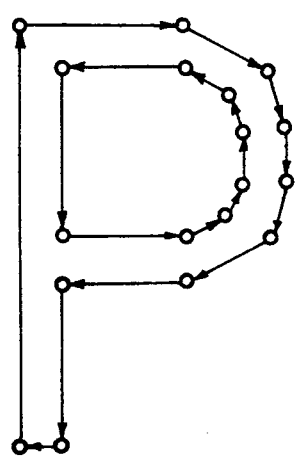
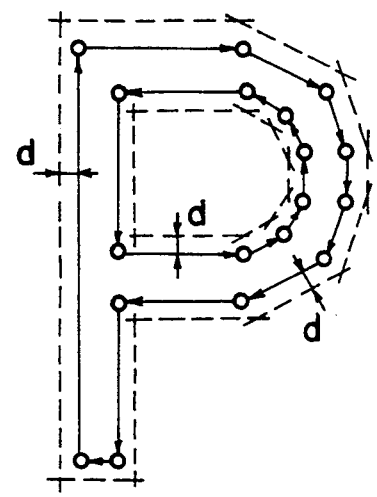
FIG. 3   FIG. 4
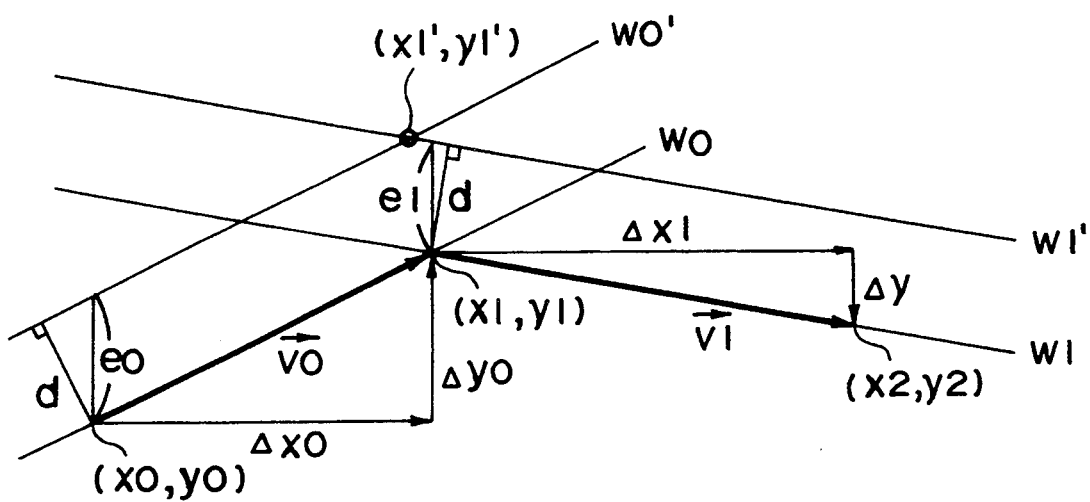
FIG. 5

METHOD AND SYSTEM OF CONVERTING DELINEATIVE PATTERN

This application is a continuation of application Ser. No. 08/094,924 filed Jul. 22, 1993, which is a continuation application of 07/690,398 filed Apr. 25, 1991, which is a continuation of application Ser. No. 07/569,737 filed Aug. 22, 1990, which is a continuation application of 07/336,514 filed Apr. 11, 1989, which is a continuation application of 06/914,733 filed Oct. 2, 1986, all abandoned.

BACKGROUND OF THE INVENTION

1. Field of the Invention

The present invention relates to a method and system for converting a delineative pattern such as a character pattern, which are applicable to a graphic pattern which processes apparatus processing patterns in the form of vector data.

2. Related Background Art

The method of converting a character pattern in the form of vector data is excellent in that patterns can be converted with high data compressibility and at a desired magnification and reduction ratio to obtain patterns of high fidelity. With this method, a vector data format representing coordinates of a contour of a character pattern is used, e.g., a series of coordinates of successive points of the contour, a series of displacement values from a start point coordinate, or the like. Conventional magnification or reduction of a pattern, however, presents a problem: for example, in the case of magnifying a character "H" of FIG. 2(A)) it is simply magnified into a similar figure as shown in FIGS. 2(B) or 2(C).

Apart from the above problem, editing graphic patterns in various forms has recently been desired extensively. For instance, not only conventional simple magnification or reduction function, but also a visual effect such as synthesizing one or plural contours produced by widening or narrowing an original contour in the form of vector data to obtain a so-called outline character has been desired. However, such graphic data processing cannot be carried out using a computer or does not make it possible to attain the desired visual balance of patterns. Therefore, such processing has relied upon complicated and laborious processes including a photographing process.

SUMMARY OF THE INVENTION

The present invention has been made in view of the above prior art problems, and it is an object of the present invention to provide a method and system of converting a graphic pattern such as a character pattern and a processing system therefor, wherein widening or narrowing a graphic pattern can be carried out while retaining the visual balance thereof, through a single pattern conversion, or plural conversions if desired, or through addition of the converted pattern to an original one if desired.

It is another object of the present invention to provide a method of converting a graphic pattern using a graphic pattern processing apparatus which processes the contour of a pattern in the form of vector data, wherein widening or narrowing processing of the contour can be carried out while retaining visual balance of the pattern, by calculating lines parallel to contour line segments of the pattern and the intersection coordinates of the lines using vector data of the pattern. These and other objects and features of the invention will be more fully appreciated upon consideration of the following detailed description of the preferred embodiments.

BRIEF DESCRIPTION OF THE DRAWINGS

FIG. 3 shows an example of vector data of a contour of a graphic character according to the present invention;

FIG. 4 is a graph illustrating a relationship between vector data and segment lines parallel to the contour;

FIG. 5 shows a coordinate of a new contour produced during widening processing;

DETAILED DESCRIPTION OF THE PREFERRED EMBODIMENT

The preferred embodiment of the present invention will be described with reference to the accompanying drawings. It is apparent that the object, effect and construction of the present invention may be achieved by a system composed of plural devices or by a single device.

Figure 1:
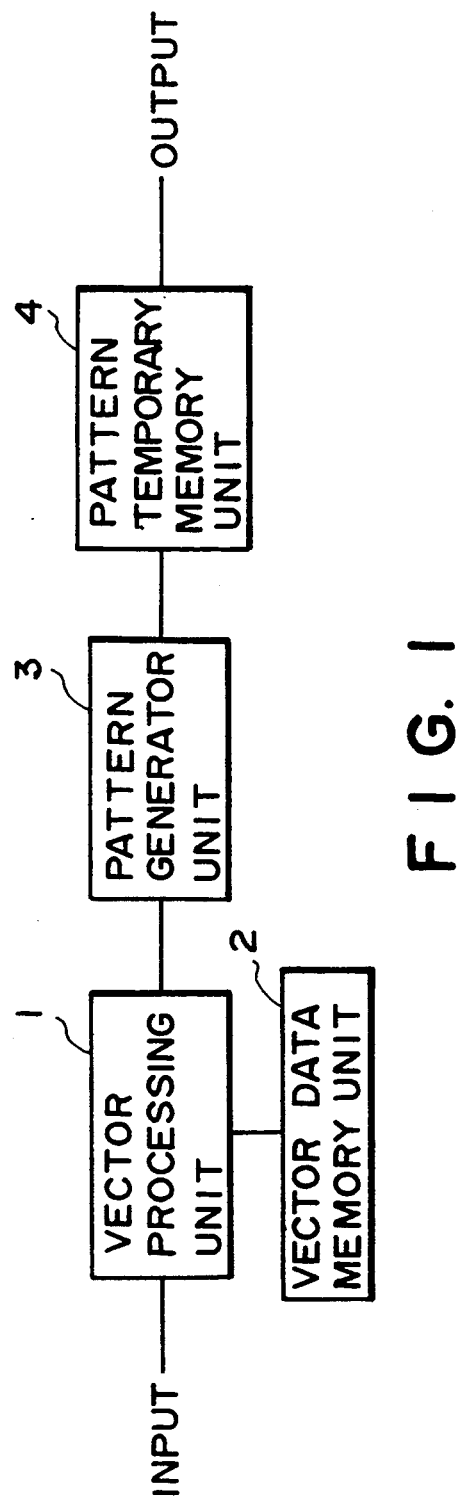
FIG. 1 is a block diagram showing an embodiment of the graphic pattern processing system according to the present invention.
Figure 2C:
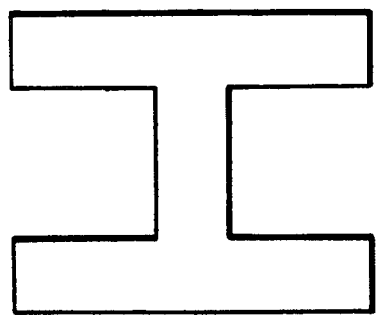
FIGS. 2 (A) to 2 (C) are views showing examples of magnification and reduction of a character according to a prior art method.
Figure 2B:
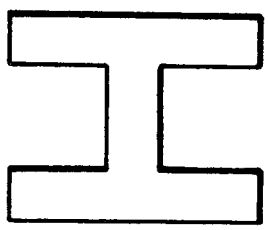
Figure 2A:
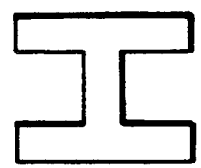

FIG. 1 is a block diagram showing an embodiment of the graphic pattern processing system according to the present invention. In the figure, reference numeral 1 denotes a vector processing unit, 2 a vector data memory unit, 3 a pattern generator unit, and 4 a pattern temporary unit.

Vector data of character data is stored in the vector data memory unit 2. Although in this embodiment, the description is directed to character data, the present invention is not limited to character data but other data is also applicable. Upon reception of a command for starting processing from an external source, the vector processing unit 1 reads data necessary for the processing from the vector data memory unit 2 and processes the data. The processed vector data is then applied to the pattern generator unit 3. The vector processing unit 1 has a CPU (not shown), a ROM starting control programs shown in FIGS. 6 and 7, and so on. The pattern generator unit 3 develops the vector data of numerical data into an actual vector pattern, and stores it in the pattern temporary memory unit 4. The stored pattern is read and outputted as a processed data output. Although not shown in FIG. 1, it is apparent that a control unit is provided which includes a display, a pointing device, or various keys, respectively for initiating an execution of such as widening processing.

The contour of a character pattern is represented by interpolating a series of vector data points (coordinates) indicated by circles with straight or curved line segments, as shown in FIG. 3. The illustrated pattern includes two "pattern elements", used herein to denote a set of one or more lines joined together, each pattern element being made up of one or more "segments" (straight line segments in the illustrated pattern).

The direction of each of the vector data between adjacent coordinates is so determined that the vector always sees the interior of the character (or the inside of the contour) to the right side.

The description is now directed to the case that the vector data pattern "P" shown in FIG. 3 is widened (or narrowed). For the purpose of simplicity of description, the vectors represented by arrows in FIG. 3 are called a contour line. The method of widening the contour line by d and obtaining a new contour line, shown by dot lines in FIG. 4, will now be described. In the widening processing as illustrated in FIG. 4, each of the vectors (contour line) is moved to a new position parallel to its previous position, by a distance d, which is the same for each vector. By doing so, it is possible to obtain a character pattern "P" moved by d while retaining visual balance.

Figure 6:
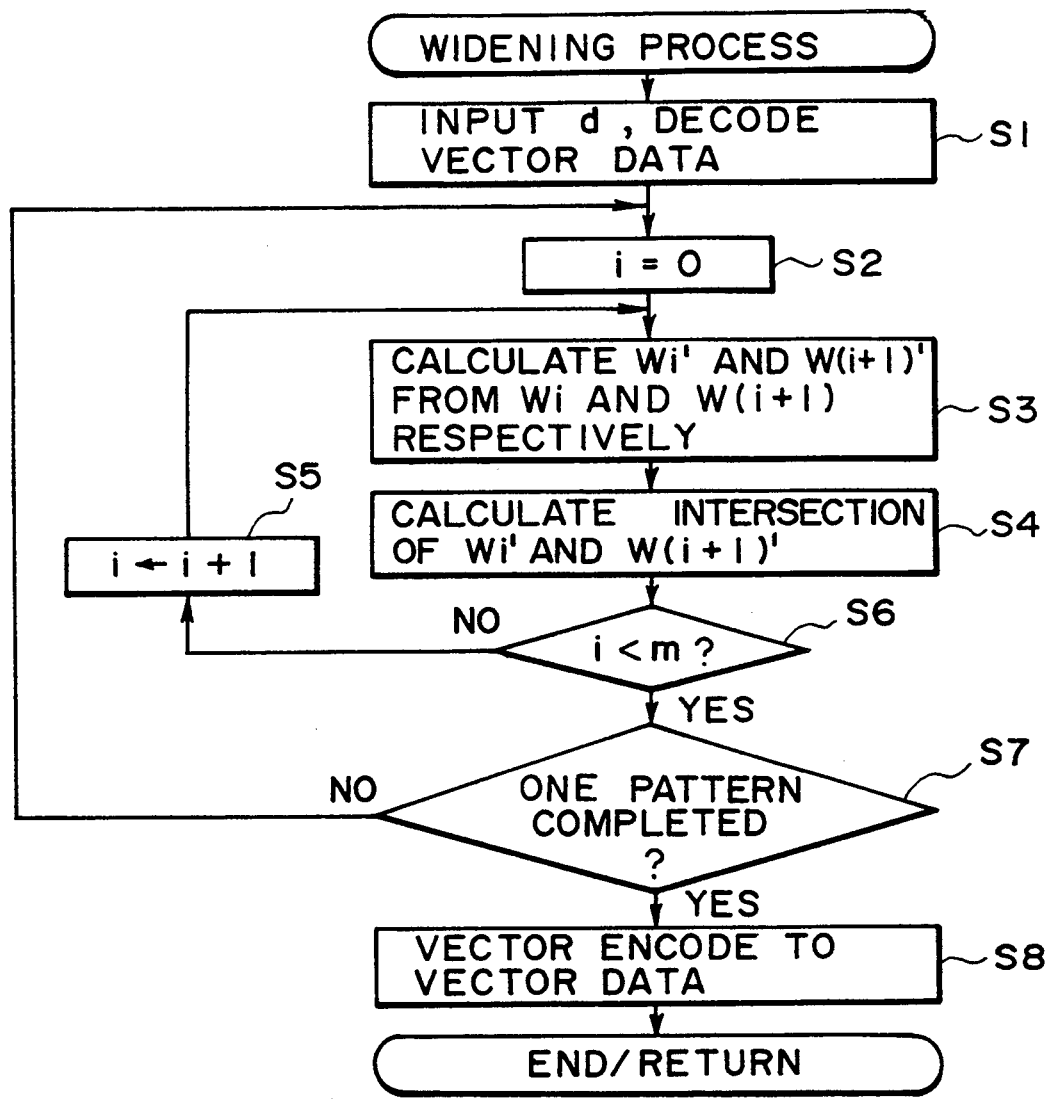
FIG. 6 is a flow chart of widening control process.

FIG. 5 is a graph for explaining widening processing of a pattern "P" as in FIG. 4. FIG. 6 is a control flow chart of the widening processing, the program of which is stored in a ROM of an unrepresented control unit, and the calculated lines and intersections of patterns are stored in a memory.

Referring now to FIG. 5 vectors $V_0$ and $V_1$ represent two adjacent vectors among a plurality of vectors constituting the contour pattern shown in FIGS. 3 and 4. The two straight lines of the part of the contour are represented by $W_0$ and $W_1$. Line $W_0$ passes through two points $(x_0, y_0)$ and $(x_1, y_1)$, while line $W_1$ passes through two points $(x_1, y_1)$ and $(x_2, y_2)$. The intersection of lines $W_0$ and $W_1$ is $(x_1, y_1)$. The widening processing is performed using the above data. At step 1 shown in FIG. 6, first after the amount d of parallel movement (for widening or narrowing) is inputted, the vector data is decoded (conversion of coordinates). Then at step S3, parallel lines $W_0'$ and $W_1'$ are obtained which are spaced apart by d from lines $W_0$ and $W_1$, respectively. At step S4, the intersection between lines $W_0'$ and $W_1'$ is obtained. These processes are conducted m times for a vector loop (closed area) constructed of m vectors (steps S3, S4, S6 and S5). In the case of FIG. 3, m=10 for the outer contour and m=8 for the inner contour. At step 7, it is judged if all the contours have been processed or not, i.e., in the case of the FIG. 3 example if steps S3 to S6 have been executed for the outer contour (m=10) and the inner contour (m=8). If completed, decode-vector data for all the contours of the pattern "P" is vector-encoded to obtain vector data at step S8.

Next, the processes at steps S5 and S6 will be discussed in detail with reference to FIG. 5.

As understood from FIG. 5, line $W_0$ can be expressed as:

$$y - y_0 \Delta y_0 / \Delta x_0 \cdot (x - x_0) \tag{1}$$

where $\Delta y_0$ and $\Delta x_0$ represent increments of line $W_0$, respectively for x- and y-coordinates. $\Delta y_1$ and $\Delta x_1$ shown in FIG. 5 also represent the same.

Line $W_0'$ parallel to line $W_0$ is expressed as:

$$W_0': y - (y_0 + e_0) = \Delta y_0 / \Delta x_0 \cdot (x - x_0) \tag{2}$$

where $e_0$ represents the amount of movement from line $W_0$ to line $W_0'$ in the y-direction, which $e_0$ is expressed as:

$$e_0 = d\sqrt{\Delta x_0^2 + \Delta y_0^2} / \Delta x_0 \tag{3}$$

Substituting equation (3) into equation (2), line $W_0'$ to be obtained is solved based on the above coordinates $(x_0, y_0)$ and $(x_1, y_1)$, and the parallel movement amount d.

The equations for solving line $W_1'$, regarding the next vector $V_1$ following vector $V_0$ and parallel to line $W_1$, are expressed as follows:

$$y - (y_1 + e_1) = \Delta y_1 / \Delta x_1 \cdot (x - x_0) \tag{4}$$

$$e_1 = d\sqrt{\Delta x_1^2 + \Delta y_1^2} / \Delta x_1 \tag{5}$$

A new intersection $(x_1', y_1')$ produced by moving vectors $V_0$ and $V_1$ by distance d can be obtained from a solution $(x, y)$ of simultaneous equation (2) and (4). For simplification, the slopes of the lines are represented here as:

$$a_0 = \Delta y_0 / \Delta x_0 \tag{6}$$

$$a_1 = \Delta y_1 / \Delta x_1$$

then, $$x_1' = [(a_0 x_0 - a_1 \cdot x_1) - \{(y_0 + e_0) - (y_1 + e_1)\}]/(a_0 - a_1) \tag{7}$$

$$y_1' = a_0(x_1' - x_0) + (y_0 + e_0) \tag{8}$$

Using known values $x_0$, $y_0$, $x_1$, $y_1$, $e_0$, $e_1$, $a_0$, and $a_1$, the intersection $(x_1', y_1')$ can be obtained from equations (7) and (8).

If a pattern has m vectors, the above calculation is repeated m times to obtain a new contour line moved by same distance d from an original contour line. If the pattern has n contour lines, the above m times calculation is repeated n times (in case of FIG. 3, n=2).

If $\Delta x_0 = 0$ or $\Delta x_1 = 0$ in equation (6) or $a_0 = a_1$ in equation (7), the above calculation is replaced by an exceptional processing.

Figure 7:
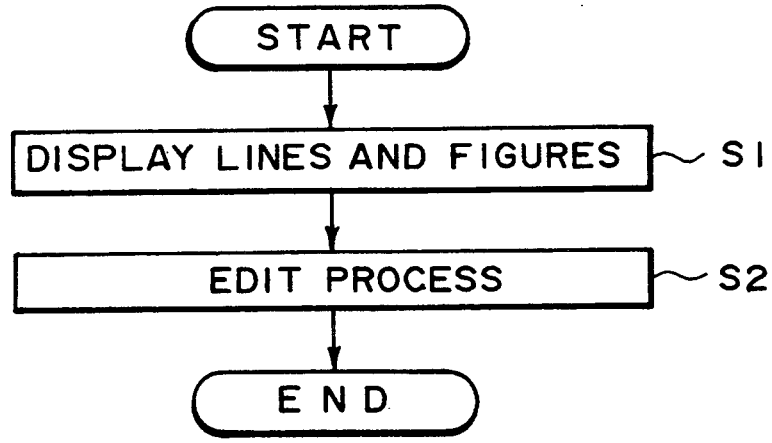
FIG. 7 is a flow chart showing the entire graphic pattern processing system.

The amount of parallel movement d may take a widening value or a narrowing value. If d is positive, the movement amount $e_0$ of equation (3) is such that the contour for each vector data is widened, whereas if d is negative the contour is narrowed. FIG. 7 is a flow chart showing the entire graphic pattern processing system, which is executed by the unrepresented control unit. In the flow chart, after a delineative pattern is formed and displayed at step S1, an editing processing such as rotating or slanting conversion including, for example, the widening processing of FIG. 6, is executed.

As appreciated from the foregoing description of the present invention, visual balance is ensured for those patterns subjected to rotating conversion, slanting conversion or any other conversion prior to the pattern conversion of the present invention.

Further, a shadow effect can be obtained in such a manner that after changing the interior of pattern subjected to a widening processing to a dot pattern, the dot pattern is moved by a certain distance to synthesize it to another dot pattern similarly obtained. New vector data having correct visual balance can readily be produced by converting original vector data through a widening or narrowing processing.

The present invention is not limited to a graphic character, but it is applicable to a general pattern of vector data. The present invention has various applications, such as to an image processing system capable of pattern processing, forms processing and the like.

As described in detail so far, the method of converting a graphic pattern, used with a pattern processing apparatus processing the contour line of the pattern in the form of vector data, has enabled calculating, in accordance with the predetermined processes, lines parallel to contour line segments of the vector data and their intersection coordinates, and parallel widening or narrowing the pattern while retaining visual balance.

We claim:

1. A pattern conversion method employing (i) storage means for storing data, in a form of a series of coordinates, representative of an original pattern comprising a plurality of pattern elements, (ii) means for reading the data from the storage means, and (iii) means for processing the data read from the storage means, wherein the processing by the processing means comprises the steps of:

parallel moving each of a plurality of segments, which plurality of segments form a contour of one of the plurality of pattern elements, by a distance d in a predetermined direction corresponding to a direction of the series of coordinates;

obtaining an intersection between adjacent ones of the moved segments; and repeating said moving and obtaining steps for the rest of the plurality of pattern elements.

2. A pattern conversion method according to claim 1, wherein each of the segments comprises a line among a plurality of lines successively connecting each of the coordinates.

3. An image processing system comprising:

storage means for storing a series of coordinate data representative of a contour of a pattern in a given order;

means for generating an instruction signal for instructing an edit processing of a pattern stored in said storage means;

operational means for obtaining, in response to the instruction signal generated by said generating means, straight lines which are parallel-moved, in a predetermined direction corresponding to a direction of the series of coordinate data, by a constant distance d relative to corresponding straight lines passing through two adjacent coordinates, in the given order, of the series stored in said storage means;

deriving means for obtaining an intersection between adjacent straight lines obtained through parallel movement by said operational means, wherein said operational means obtains the straight lines such that an original pattern is widened depending upon whether d is positive or not; and painting means for painting the inside of the widened pattern.

4. An image processing system according to claim 3, wherein said generating means comprises an operation unit for initiating widening of an original pattern.

5. An image processing system according to claim 3, wherein said operational means obtains the amount, in terms of y-coordinates, of parallel movement of the straight line, from the series of coordinate data.

6. An image processing system comprising:

storage means for storing a series of coordinate data representative of the contour of an image in a given order;

first edit means for effecting first predetermined processing of the image stored in said storing means;

instruction means for instructing performance of a widening processing on the image edited by said first edit means;

second edit means for effecting, in response to an instruction by said instruction means, a widening processing of the image edited by said first edit means, said second edit means including first deriving means for deriving a straight line which is obtained by parallel moving by a certain distance each straight line passing through two coordinates adjacent, in the given order, in the series and representative of the image which has been edited by said first edit means, and second deriving means for deriving intersections between a plurality of straight lines derived by said first deriving means; and output means for outputting an image after the image has been subjected to a widening processing which image to be output is represented by the intersections derived by said second deriving means and by the straight lines passing through the intersections derived by said first deriving means.

7. An image processing system according to claim 6, wherein said output means includes interpolation means for interpolating straight lines between the intersections.

8. An image processing system according to claim 6, wherein said first deriving means performs a widening processing of an original image depending upon whether the constant distance is positive.

9. An image processing system according to claim 6, wherein said second edit means can perform a uniform widening processing of an original image, irrespective of whether said first edit means performs an editing.

10. A pattern conversion method according to claim 1, wherein the reading means in sequence generates the series of coordinates stored by the storage means so as to form the segments in sequence such that a predetermined side of each segment is toward the inside of the pattern.

11. A pattern conversion method according to claim 1, wherein a new pattern is obtained by equally widening or narrowing the original pattern with the center of the new pattern coincident with that of the original pattern by the processing means.

12. A pattern conversion method according to claim 1, wherein said moving step further comprises at least the step of obtaining equations wherein $W_0$ denotes a straight line through two points respectively having coordinates $(x_0, y_0)$ and $(x_1, y_1)$ in a predetermined coordinate system, and $W_1$ denotes a straight line through the point having the coordinates $(x_1, y_1)$ and a point having coordinates $(x_2, y_2)$, the lines $W_0$ and $W_1$ representing the contour; $W_0'$ and $W_1'$ denote straight lines obtained by parallel-moving each of the straight lines $W_0$ and $W_1$ by the distance d, respectively; $e_0$ and $e_1$ denote change in y-intercept between $W_0$ and $W_0'$ and between $W_1$ and $W_1'$, respectively; $\Delta x_0$ and $\Delta y_0$ denote increments of $W_0$ in x and y coordinates, respectively; and $\Delta x_1$ and $\Delta y_1$ denote increments of $W_1$ in x and y coordinates, respectively, the equations being:

$$y-(y_0+e_0)=\Delta y_0/\Delta x_0\,(x-x_0) \text{ for } W_0' \text{ and}$$

$$y-(y_1+e_1)=\Delta y_1/\Delta x_1\,(x-x_1) \text{ for } W_1';$$

and wherein said obtaining step further comprises the step of obtaining a new intersection ($x_1'$, $y_1'$) between the lines $W_0'$ and $W_1'$.

13. A pattern conversion method according to claim 1, wherein, in a case of narrowing the pattern, each segment is parallel-moved by the distance d into the inside of the contour.

14. An image processing system according to claim 3, wherein said operational means generates in sequence the series of coordinate data stored by said storage means so as to form in sequence a plurality of segments constituting the pattern such that a predetermined side of each segment is toward the inside of the pattern.

15. An image processing system according to claim 3, wherein the resulting pattern is equally widened by said operational means, with its center coincident with that of the original pattern.

16. An image processing system according to claim 3, wherein said operational means and said calculating means obtain equations wherein $W_0$ denotes a straight line through two points respectively having coordinates ($x_0$, $y_0$) and ($x_1$, $y_1$) in a predetermined coordinate system, and $W_1$ denotes a straight line through the point having the coordinates ($x_1$, $y_1$) and a point having coordinates ($x_2$, $y_2$), the lines $W_0$ and $W_1$ representing the contour; $W_0'$ and $W_1'$ denote straight lines obtained by parallel-moving each of the straight lines $W_0$ and $W_1$ by the distance d, respectively; $e_0$ and $e_1$ denote change in y-intercept between $W_0$ and $W_0'$ and between $W_1$ and $W_1'$, respectively; $\Delta x_0$ and $\Delta y_0$ denote increments of $W_0$ in x and y coordinates, respectively; and $\Delta x_1$ and $\Delta y_1$ denote increments of $W_1$ in x and y coordinates, respectively, the equations being:

$$y-(y_0+e_0)=\Delta y_0/\Delta x_0\,(x-x_0) \text{ for } W_0' \text{ and}$$

$$y-(y_1+e_1)=\Delta y_1/\Delta x_1\,(x-x_1) \text{ for } W_1';$$

and wherein said operational means and said calculating means obtain a new intersection ($x_1'$, $y_1'$) between the lines $W_0'$ and $W_1'$.

17. An image processing system according to claim 3, wherein said painting means paints only the inside of the widened pattern obtained by said operation means.

18. An image processing system according to claim 3, wherein the pattern comprises a plurality of pattern elements.

19. An image processing system according to claim 6, wherein said first deriving means generates in sequence the series of coordinates stored by said storage means so as to form in sequence a plurality of segments constituting the pattern such that a predetermined side of each segment is toward the inside of the pattern.

20. An image processing system according to claim 6, wherein said output means obtains a new pattern equally widened with its center coincident with that of the pattern edited by said first edit means.

21. An image processing system according to claim 16, wherein said second edit means obtains equations wherein $W_0$ denotes a straight line through two points respectively having coordinates ($x_0$, $y_0$) and ($x_1$, $y_1$) in a predetermined coordinate system, and $W_1$ denotes a straight line through the point having the coordinates ($x_1$, $y_1$) and a point having coordinates ($x_2$, $y_2$), representing the contour; $W_0'$ and $W_1'$ denote straight lines obtained by parallel-moving each of the straight lines $W_0$ and $W_1$ by the distance d, respectively; $e_0$ and $e_1$ denote change in y-intercept between $W_0$ and $W_0'$ and between $W_1$ and $W_1'$, respectively; $\Delta x_0$ and $\Delta y_0$ denote increments of $W_0$ in x and y coordinates, respectively; and $\Delta x_1$ and $\Delta y_1$ denote increments of $W_1$ in x and y coordinates, respectively, the equations being:

$$y-(y_0+e_0)=\Delta y_0/\Delta x_0\,(x-x_0) \text{ for } W_0' \text{ and}$$

$$y-(y_1+e_1)=\Delta y_1/\Delta x_1\,(x-x_1) \text{ for } W_1';$$

and wherein said second edit means obtains a new intersection ($x_1'$, $y_1'$) between the lines $W_0'$ and $W_1'$.

22. An image processing system according to claim 6, wherein one image pattern includes a plurality of pattern elements comprising a plurality of the straight lines.

23. A pattern conversion method comprising the steps of:

obtaining equations based on pattern data in a form of a series of coordinates, wherein $W_0$ denotes a straight line through two points respectively having coordinates ($x_0$, $y_0$) and ($x_1$, $y_1$) in a predetermined coordinate system, and $W_1$ denotes a straight line through the point having the coordinates ($x_1$, $y_1$) and a point having coordinates ($x_2$, $y_2$) the lines $W_0$ and $W_1$ constituting a pattern, wherein $W_0'$ and $W_1'$ denote straight lines obtained by parallel-moving, in a predetermined direction corresponding to a direction of the series of coordinates, each of the straight lines $W_0$ and $W_1$ by the distance d, respectively; wherein $e_0$ and $e_1$ denote change in y-intercept between $W_0$ and $W_0'$ and between $W_1$ and $W_1'$, respectively; wherein $\Delta x_0$ and $\Delta y_0$ denote increments of $W_0$ in x and y coordinates, respectively; and wherein $\Delta x_1$ and $\Delta y_1$ denote increments of $W_1$ in x and y coordinates, respectively, the equations being:

$$y-(y_0+e_0)=\Delta y_0/\Delta x_0\,(x-x_0) \text{ for } W_0' \text{ and}$$

$$y-(y_1+e_1)=\Delta y_1/\Delta x_1\,(x-x_1) \text{ for } W_1';$$

obtaining a new intersection ($x_1'$, $y_1'$) between the lines $W_0'$ and $W_1'$; and determining whether the foregoing steps should be repeated, in response to whether every new intersection has been obtained for the one pattern.

24. A pattern conversion method according to claim 23, wherein the distance d is assigned a polarity (+ or −) according to whether the pattern is to be widened or narrowed.

25. A pattern conversion method according to claim 23, wherein the pattern comprises at least three straight lines.

26. An image processing system according to claim 6, wherein the processing effected by said first edit means includes rotation of the coordinate data.

27. An image processing system according to claim 6, wherein the processing effected by said first edit means includes slanting of the coordinate data.

28. An image processing system according to claim 6, wherein said storage means, said first and second edit means, said instruction means and said output means are all in a single apparatus.

29. An image processing system according to claim 6, wherein said storage means, said first and second edit means, said instruction means and said output means are not all in a single apparatus.

30. An image processing system according to claim 3, wherein said storage means, said generating means, said operational means, said deriving means and said painting means are all in a single apparatus.

31. An image processing system according to claim 3, wherein said storage means, said generating means, said operational means, said deriving means and said painting means are not all in a single apparatus.

32. An image processing method employing storage means for storing a series of coordinate data representative of a contour of a pattern in a given order, said method comprising the steps of:
generating an instruction signal for instructing an edit processing of a pattern stored in the storage means;
obtaining, in response to the instruction signal, straight lines which are parallel-moved, in a predetermined direction corresponding to a direction of the series of coordinate data, by a constant distance d relative to corresponding straight lines passing through two adjacent coordinates, in the given order, of the series stored in the storage means;
deriving an intersection between adjacent straight lines obtained through parallel movement in said obtaining step, wherein the straight lines are obtained in said obtaining step such that an original pattern is widened depending upon whether d is positive or not; and
painting an inside of the widened pattern.

33. An image processing method according to claim 32, wherein said generating step further comprises initiating widening of an original pattern.

34. An image processing method according to claim 32, wherein, in said obtaining step, the amount, in terms of y-coordinates, of parallel movement of the straight line, is obtained from the series of coordinate data.

35. An image processing method according to claim 32, wherein, in said obtaining step, the series of coordinate data stored in the storage means are generated in sequence so as to form in sequence a plurality of segments constituting the pattern such that a predetermined side of each segment is toward the inside of the pattern.

36. An image processing method according to claim 32, wherein the resulting pattern is equally widened in said obtaining step, with its center coincident with that of the original pattern.

37. An image processing method according to claim 32, wherein, in said obtaining and deriving steps, are obtained equations wherein $W_0$ denotes a straight line through two points respectively having coordinates ($x_0$, $y_0$) and ($x_1$, $y_1$) in a predetermined coordinate system, and $W_1$ denotes a straight line through the point having the coordinates ($x_1$, $y_1$) and a point having coordinates ($x_2$, $y_2$), the lines $W_0$ and $W_1$ representing the contour; $W_0'$ and $W_1'$ denote straight lines obtained by parallel-moving each of the straight lines $W_0$ and $W_1$ by the distance d, respectively; $e_0$ and $e_1$ denote change in y-intercept between $W_0$ and $W_0'$ and between $W_1$ and $W_1'$, respectively; $\Delta x_0$ and $\Delta y_0$ denote increments of $W_0$ in x and y coordinates, respectively; and $\Delta x_1$ and $\Delta y_1$ denote increments of $W_1$ in x and y coordinates, respectively, the equations being:

$$y-(y_0+e_0)=\Delta y_0/\Delta x_0(x-x_0) \text{ for } W_0' \text{ and}$$

$$y-(y_1+e_1)=\Delta y_1/\Delta x_1(x-x_1) \text{ for } W_1';$$

and wherein, in said deriving step, is derived a new intersection ($x_1'$, $y_1'$) between the lines $W_0'$ and $W_1'$.

38. An image processing method according to claim 32, wherein only the inside of the widened pattern obtained in said obtaining step is painted in said painting step.

39. An image processing method according to claim 32, wherein the pattern comprises a plurality of pattern elements.

40. An image processing method employing storage means for storing a series of coordinate data representative of a contour of an image in a given order, said method comprising the steps of:
performing first editing, by effecting first predetermined processing of the image stored in the storage means;
instructing performance of a widening processing or narrowing processing on the image edited in said first-editing step;
performing second editing, by effecting, in response to an instruction in said instructing step, a widening processing or narrowing processing of the image edited in said first-editing step, said second-editing including deriving a straight line which is obtained by parallel moving, in a predetermined direction corresponding to a direction of the series of coordinate data, by a certain distance each straight line passing through two coordinates adjacent, in the given order, in the series and representative of the image which has been edited in said first-editing step, and deriving intersections between a plurality of straight lines derived in said first-deriving sub-step; and
outputting an image after the image has been subjected to a widening processing or narrowing processing, which image to be output is represented by the intersections derived in said second-deriving sub-step and by the straight lines passing through the intersections derived in said first-deriving sub-step.

41. An image processing method according to claim 40, wherein said outputting step includes interpolating straight lines between the intersections.

42. An image processing method according to claim 40, wherein said first-deriving sub-step includes a widening processing of an original image depending upon whether the constant distance is positive or not.

43. An image processing method according to claim 40, wherein said second-editing step includes a uniform widening processing of an original image, irrespective of whether said first-editing step effects an editing.

44. An image processing method according to claim 40, wherein, in said first-deriving sub-step, the series of coordinates stored in the storage means are generated in sequence so as to form in sequence a plurality of segments constituting the pattern such that a predetermined side of each segment is toward the inside of the pattern.

45. An image processing method according to claim 40, wherein, in said outputting step, a new pattern is obtained, equally widened with its center coincident with that of the pattern edited in said first-editing step.

46. An image processing method according to claim 40, wherein, in said second-editing step, are obtained equations wherein $W_0$ denotes a straight line through two points respectively having coordinates ($x_0$, $y_0$) and ($x_1$, $y_1$) in a predetermined coordinate system, and $W_1$ denotes a straight line through the point having the coordinates ($x_1$, $y_1$) and a point having coordinates ($x_2$, $y_2$), representing the contour; wherein $W_0'$ and $W_1'$ denote straight lines obtained by parallel-moving each of the straight lines $W_0$ and $W_1$ by the distance d, respectively; $e_0$ and $e_1$ denote change in y-intercept between $W_0$ and $W_0'$ and between $W_1$ and $W_1'$, respectively; $\Delta x_0$ and $\Delta y_0$ denote increments of $W_0$ in x and y coordinates, respectively; and $\Delta x_1$ and $\Delta y_1$ denote increments of $W_1$ in x and y coordinates, respectively, the equations being:

$$y-(y_0+e_0)=\Delta y_0/\Delta x_0(x-x_0) \text{ for } W_0' \text{ and}$$

$$y-(y_1+e_1)=\Delta y_1/\Delta x_1(x-x_1) \text{ for } W_1';$$

and wherein, in said second-editing step, is obtained a new intersection $(x_1', y_1')$ between the lines $W_0'$ and $W_1'$.

47. An image processing method according to claim 40, wherein one image pattern includes a plurality of pattern elements comprising a plurality of the straight lines.

48. An image processing method according to claim 40, wherein the processing effected in said first-editing step includes rotation of the coordinate data.

49. An image processing method according to claim 40, wherein the processing effected in said first-editing step includes slanting of the coordinate data.

50. A pattern conversion system, comprising:
    storage means for storing data, in a form of a series of coordinates, representative of an original pattern comprising a plurality of pattern elements;
    means for reading the data from said storage means; and
    means for processing the data read from said storage means and representative of the pattern, wherein the processing by said processing means further comprises:
    parallel moving each of a plurality of segments, which plurality of segments form a contour of one of the plurality of pattern elements, by a distance d in a predetermined direction corresponding to a direction of the series of coordinates,
    obtaining an intersection between adjacent ones of the moved segments, and
    repeating the moving and obtaining operations for the rest of the plurality of pattern elements.

51. A pattern conversion system according to claim 50, wherein each of the segments comprises a line among a plurality of lines successively connecting each of the coordinates.

52. A pattern conversion system according to claim 50, wherein said reading means generates in sequence the series of coordinates stored by said storage means so as to form the segments in sequence such that a predetermined side of each segment is toward the inside of the pattern.

53. A pattern conversion system according to claim 50, wherein a new pattern is obtained by equally widening or narrowing the original pattern with the center of the new pattern coincident with that of the original pattern by said processing means.

54. A pattern conversion system according to claim 50, wherein the moving operation performed by said processing means further comprises obtaining equations, wherein $W_0$ denotes a straight line through two points respectively having coordinates $(x_0, y_0)$ and $(x_1, y_1)$ in a predetermined coordinate system, and $W_1$ denotes a straight line through the point having the coordinates $(x_1, y_1)$ and a point having coordinates $(x_2, y_2)$, the lines $W_0$ and $W_1$ representing the contour; wherein $W_0'$ and $W_1'$ denote straight lines obtained by parallel-moving each of the straight lines $W_0$ and $W_1$ by the distance d, respectively; $e_0$ and $e_1$ denote change in y-intercept between $W_0$ and $W_0'$ and between $W_1$ and $W_1'$, respectively; $\Delta x_0$ and $\Delta y_0$ denote increments of $W_0$ in x and y coordinates, respectively; and $\Delta x_1$ and $\Delta y_1$ denote increments of $W_1$ in x and y coordinates, respectively, the equations being:

$$y-(y_0+e_0)=\Delta y_0/\Delta x_0(x-x_0) \text{ for } W_0' \text{ and}$$

$$y-(y_1+e_1)=\Delta y_1/\Delta x_1(x-x_1) \text{ for } W_1';$$

and wherein, in the obtaining operation, is obtained a new intersection $(x_1', y_1')$ between the lines $W_0'$ and $W_1'$.

55. A pattern conversion system according to claim 50, wherein in a case of narrowing the pattern, each segment is parallel-moved by the distance d into the inside of the contour.

56. A pattern conversion system according to claim 50, wherein said storage means, said reading means and said processing means are all in a single apparatus.

57. A pattern conversion system according to claim 50, wherein said storage means, said reading means and said processing means are not all in a single apparatus.

58. A pattern conversion apparatus, comprising:
    computing means for obtaining equations based on pattern data in a form of a series of coordinates, wherein $W_0$ denotes a straight line through two points respectively having coordinates $(x_0, y_0)$ and $(x_1, y_1)$ in a predetermined coordinate system, and $W_1$ denotes a straight line through the point having the coordinates $(x_1, y_1)$ and a point having coordinates $(x_2, y_2)$, the lines $W_0$ and $W_1$ forming a pattern; wherein $W_0'$ and $W_1'$ denote straight lines obtained by parallel-moving, in a predetermined direction corresponding to a direction of the series of coordinates, each of the straight lines $W_0$ and $W_1$ by a distance d, respectively; wherein $e_0$ and $e_1$ denote change in y-intercept between $W_0$ and $W_0'$ and between $W_1$ and $W_1'$, respectively; wherein $\Delta x_0$ and $\Delta y_0$ denote increments of $W_0$ in x and y coordinates, respectively; and wherein $\Delta x_1$ and $\Delta y_1$ denote increments of $W_1$ in x and y coordinates, respectively; the equations being:

$$y-(y_0+e_0)=\Delta y_0/\Delta x_0(x-x_0) \text{ for } W_0' \text{ and}$$

$$y-(y_1+e_1)=\Delta y_1/\Delta x_1(x-x_1) \text{ for } W_1';$$

and for obtaining a new intersection $(x_1', y_1')$ between the lines $W_0'$ and $W_1'$; and
    control means for determining whether to cause said computing means to repeat performance of the foregoing obtaining operations, based on whether every new intersection has been obtained for the one pattern.

59. A pattern conversion apparatus according to claim 58, wherein the distance d is assigned a polarity (+ or −) according to whether the pattern is to be widened or narrowed.

60. A pattern conversion apparatus according to claim 58, wherein the pattern comprises at least three straight lines.

61. A pattern conversion apparatus according to claim 58, wherein said computing means and said control means are both in a single apparatus.

62. A pattern conversion apparatus according to claim 58, wherein said computing means and said control means are not both in a single apparatus.

63. An image processing system comprising:
storage means for storing a series of coordinate data representative of a contour of a pattern in a given order;
means for generating an instruction signal for instructing an edit processing of a pattern stored in said storage means;
operational means for obtaining, in response to the instruction signal generated by said generating means, straight lines which are parallel-moved, in a predetermined direction corresponding to a direction of the series of coordinate data, by a constant distance d relating to corresponding straight lines passing through two adjacent coordinates, in the given order, of the series stored in said storage means;
deriving means for obtaining an intersection between adjacent straight lines obtained through parallel movement by said operational means, wherein said operational means obtains the straight lines such that an original pattern is narrowed depending upon whether d is positive or not; and
painting means for painting an inside of the narrowed pattern.

64. An image processing system according to claim 63, wherein said generating means comprises an operation unit for initiating narrowing of an original pattern.

65. An image processing system according to claim 63, wherein said operational means obtains the amount, in terms of y-coordinates, of parallel movement of the straight line, from the series of coordinate data.

66. An image processing system comprising:
storage means for storing a series of coordinate data representative of a contour of an image in a given order;
first edit means for effecting first predetermined processing of the image stored in said storage means;
instruction means for instructing performance of a narrowing processing on the image edited by said first edit means;
second edit means for effecting, in response to an instruction by said instruction means, a narrowing processing of the image edited by said first edit means, said second edit means including first deriving means for deriving a straight line which is obtained by parallel moving, in a predetermined direction corresponding to a direction of the series of coordinate data, by a certain distance each straight line passing through two coordinates adjacent, in the given order, in the series and representative of the image which has been edited by said first edit means, and second deriving means for deriving intersections between a plurality of straight lines derived by said first deriving means; and
output means for outputting an image after the image has been subjected to a narrowing processing, which image to be output is represented by the intersections derived by said second deriving means and by the straight lines passing through the intersections derived by said first deriving means.

67. An image processing system according to claim 63, wherein, in narrowing the pattern, each of the straight lines is parallel-moved into the inside of the pattern by the distance d.

68. An image processing system according to claim 66, wherein, in narrowing the pattern, each of the straight lines is parallel-moved into the inside of the pattern by the distance d by said second edit means.

69. An image processing system according to claim 66, wherein said output means includes interpolation means for interpolating straight lines between the intersections.

70. An image processing system according to claim 66, wherein said first deriving means performs a narrowing processing of an original image depending upon whether the constant distance is positive or not.

71. An image processing system according to claim 66, wherein said second edit means can perform a uniform narrowing processing of an original image, irrespective of whether said first edit means performs an editing.

72. An image processing system according to claim 63, wherein said operational means generates in sequence the series of coordinate data stored by said storage means so as to form in sequence a plurality of segments constituting the pattern such that a predetermined side of each segment is toward the inside of the pattern.

73. An image processing system according to claim 63, wherein the resulting pattern is equally narrowed by said operational means, with its center coincident with that of the original pattern.

74. An image processing system according to claim 63, wherein said operational means and said deriving means obtain equations, wherein $W_0$ denotes a straight line through two points respectively having coordinates $(x_0, y_0)$ and $(x_1, y_1)$ in a predetermined coordinate system, and $W_1$ denotes a straight line through the point having the coordinates $(x_1, y_1)$ and a point having coordinates $(x_2, y_2)$, the lines $W_0$ and $W_1$ representing the contour; wherein $W_0'$ and $W_1'$ denote straight lines obtained by parallel-moving each of the straight lines $W_0$ and $W_1$ by the distance d, respectively; $e_0$ and $e_1$ denote change in y-intercept between $W_0$ and $W_0'$ and between $W_1$ and $W_1'$, respectively; $\Delta x_0$ and $\Delta y_0$ denote increments of $W_0$ in x and y coordinates, respectively; and $\Delta x_1$ and $\Delta y_1$ denote increments of $W_1$ in x and y coordinates, respectively, the equations being:

$$y-(y_0+e_0)=\Delta y_0/\Delta x_0(x-x_0) \text{ for } W_0' \text{ and}$$

$$y-(y_1+e_1)=\Delta y_1/\Delta x_1(x-x_1) \text{ for } W_1';$$

wherein said operational means and said deriving means obtain a new intersection $(x_1', y_1')$ between the lines $W_0'$ and $W_1'$.

75. An image processing system according to claim 63, wherein said painting means paints only the inside of the narrowed pattern obtained by said operational means.

76. An image processing system according to claim 63, wherein the pattern comprises a plurality of pattern elements.

77. An image processing system according to claim 66, wherein said first deriving means generates in sequence the series of coordinates stored by said storage means so as to form in sequence a plurality of segments constituting the pattern such that a predetermined side of each segment is toward the inside of the pattern.

78. An image processing system according to claim 66, wherein said output means obtains a new pattern equally narrowed with its center coincident with that of the pattern edited by said edited by said first edit means.

79. An image processing system according to claim 66, wherein said second edit means obtain equations, wherein $W_0$ denotes a straight line through two points respectively having coordinates $(x_0, y_0)$ and $(x_1, y_1)$ in a predetermined coordinate system, and $W_1$ denotes a straight line through the point having the coordinates $(x_1, y_1)$ and a point having coordinates $(x_2, y_2)$ representing the contour, wherein $W_0'$ and $W_1'$ denote straight lines obtained by parallel-moving each of the straight lines $W_0$ and $W_1$ by the distance d, respectively, $e_0$ and $e_1$ denote change in y-intercept between $W_0$ and $W_0'$ and between $W_1$ and $W_1'$, respectively; $\Delta x_0$ and $\Delta y_0$ denote increments of $W_0$ in x and y coordinates, respectively; and $\Delta x_1$ and $\Delta y_1$ denote increments of $W_1$ in x and y coordinates, respectively, the equations being:

$$y-(y_0+e_0)=\Delta y_0/\Delta x_0(x-x_0) \text{ for } W_0' \text{ and}$$

$$y-(y_1+e_1)=\Delta y_1/\Delta x_1(x-x_1) \text{ for } W_1';$$

wherein said second edit means obtains a new intersection $(x_1', y_1')$ between the lines $W_0'$ and $W_1'$.

80. An image processing system according to claim 66, wherein one image pattern includes a plurality of pattern elements comprising a plurality of straight lines.

81. An image processing system according to claim 66, wherein the processing effected by said first edit means includes rotation of the coordinate data.

82. An image processing system according to claim 66, wherein the processing effected by said first edit means includes slanting of the coordinate data.

83. An image processing system according to claim 66, wherein said storage means, said first and second edit means, said instruction means and said output means are all in a single apparatus.

84. An image processing system according to claim 66, wherein said storage means, said first and second edit means, said instruction means and said output means are not all in a single apparatus.

85. An image processing system according to claim 63, wherein said storage means, said generating means, said operational means, said deriving means and said painting means are all in a single apparatus.

86. An image processing system according to claim 63, wherein said storage means, said generating means, said operational means, said deriving means and said painting means are not all in a single apparatus.

87. An image processing method employing storage means for storing a series of coordinate data representative of a contour of a pattern in a given order, said method comprising the steps of:
generating an instruction signal for instructing an edit processing of a pattern stored in the storage means;
obtaining, in response to the instruction signal, straight lines which are parallel-moved, in a predetermined direction corresponding to a direction of the series of coordinate data, by a constant distance d relative to corresponding straight lines passing through two adjacent coordinates, in the given order, of the series stored in the storage means;
deriving an intersection between adjacent straight lines obtained through parallel movement in said obtaining step, wherein the straight lines are obtained in said obtaining step such that an original pattern is narrowed depending upon whether d is positive or not; and
painting an inside of the narrowed pattern.

88. An image processing system according to claim 87, wherein, in narrowing the pattern, each of the straight lines is parallel-moved into the inside of the pattern by the distance d.

89. An image processing system according to claim 87, wherein said generating step further comprises initiating narrowing of an original pattern.

90. An image processing method according to claim 87, wherein, in said obtaining step, the amount, in terms of y-coordinates, of parallel movement of the straight line, is obtained from the series of coordinate data.

91. An image processing method according to claim 87, wherein, in said obtaining step, the series of coordinate data stored in the storage means are generated in sequence so as to form in sequence a plurality of segments constituting the pattern such that a predetermined side of each segment is toward the inside of the pattern.

92. An image processing method according to claim 87, wherein the resulting pattern is equally narrowed in said obtaining step, with its center coincident with that of the original pattern.

93. An image processing method according to claim 87, wherein, in said obtaining and deriving steps, are obtained equations, wherein $W_0$ denotes a straight line through two points respectively having coordinates $(x_0, y_0)$ and $(x_1, y_1)$ in a predetermined coordinate system, and $W_1$ denotes a straight line through the point having the coordinates $(x_1, y_1)$ and a point having coordinates $(x_2, y_2)$, the lines $W_0$ and $W_1$ representing the contour; $W_0'$ and $W_1'$ denote straight lines obtained by parallel-moving each of the straight lines $W_0$ and $W_1$ by the distance d, respectively; $e_0$ and $e_1$ denote change in y-intercept between $W_0$ and $W_0'$ and between $W_1$ and $W_1'$, respectively; $\Delta x_0$ and $\Delta y_0$ denote increments of $W_0$ in x and y coordinates, respectively; and $\Delta x_1$ and $\Delta y_1$ denote increments of $W_1$ in x and y coordinates, respectively, the equations being:

$$y-(y_0+e_0)=\Delta y_0/\Delta x_0(x-x_0) \text{ for } W_0' \text{ and}$$

$$y-(y_1+e_1)=\Delta y_1/\Delta x_1(x-x_1) \text{ for } W_1';$$

wherein, in said deriving step, is derived a new intersection $(x_1', y_1')$ between the lines $W_0'$ and $W_1'$.

94. An image processing method according to claim 87, wherein only the inside of the narrowed pattern obtained in said obtaining step is painted in said painting step.

95. An image processing method according to claim 87, wherein the pattern comprises a plurality of pattern elements.

96. An image processing method employing storage means for storing a series of coordinate data representative of a contour of an image in a given order, said method comprising the steps of:
performing first editing, by effecting first predetermined processing of the image stored in the storage means;
instructing performance of a narrowing processing on the image edited in said first editing step;
performing second editing, by effecting, in response to an instruction in said instructing step, a narrowing processing of the image edited in said first-editing including deriving a straight line which is obtained by parallel moving, in a predetermined direction corresponding to a direction of the series of coordinate data, by a certain distance each straight line passing through two coordinates adjacent, in the given order, in the series and representative of the image which has been edited in said first-editing step, and deriving intersections between a plurality of straight lines derived in said first-deriving sub-step; and outputting an image after the image has been subjected to a narrowing processing, which image to be output is represented by the intersections derived in said second-deriving sub-step and by the straight lines passing through the intersections derived in said first-deriving sub-step.

97. An image processing method according to claim 96, wherein, in narrowing the pattern, each of the straight lines is parallel-moved into the inside of the pattern by the distance d in said second-editing step.

98. An image processing method according to claim 96, wherein said outputting step includes interpolating straight lines between the intersections.

99. An image processing method according to claim 96, wherein said first-deriving sub-step includes a narrowing processing of an original image depending upon whether the constant distance is positive or not.

100. An image processing method according to claim 96, wherein said second-editing step includes a uniform narrowing processing of an original image, irrespective of whether said first-editing step effects an editing.

101. An image processing method according to claim 96, wherein, in said first-deriving sub-step, the series of coordinates stored in the storage means are generated in sequence so as to form in sequence a plurality of segments constituting the pattern such that a predetermined side of each segment is toward the inside of the pattern.

102. An image processing method according to claim 96, wherein, in said outputting step, a new pattern is obtained, equally narrowed with its center coincident with that of the pattern edited in said first-editing step.

103. An image processing method according to claim 96, wherein, in said second-editing step, are obtained equations, wherein $W_0$ denotes a straight line through two points respectively having coordinates $(x_0, y_0)$ and $(x_1, y_1)$ in a predetermined coordinate system, and $W_1$ denotes a straight line through the point having the coordinates $(x_1, y_1)$ and a point having coordinates $(x_2, y_2)$, representing the contour; wherein $W_0'$ and $W_1'$ denote straight lines obtained by parallel-moving each of the straight lines $W_0$ and $W_1$ by the distance d, respectively; $e_0$ and $e_1$ denote change in y-intercept between $W_0$ and $W_0'$ and between $W_1$ and $W_1'$, respectively; $\Delta x_0$ and $\Delta y_0$ denote increments of $W_0$ in x and y coordinates, respectively; and $\Delta x_1$ and $\Delta y_1$ denote increments of $W_1$ in x and y coordinates, respectively, the equations being:

$$y-(y_0+e_0)=\Delta y_0/\Delta x_0(x-x_0) \text{ for } W_0' \text{ and}$$

$$y-(y_1+e_1)=\Delta y_1/\Delta x_1(x-x_1) \text{ for } W_1';$$

wherein, in said second-editing step, is obtained a new intersection $(x_1', y_1')$ between the lines $W_0'$ and $W_1'$.

104. An image processing method according to claim 96, wherein one image pattern includes a plurality of pattern elements comprising a plurality of straight lines.

105. An image processing method according to claim 96, wherein the processing effected by said first editing step includes rotation of the coordinate data.

106. An image processing method according to claim 96, wherein the processing effected by said first editing step includes slanting of the coordinate data.

* * * * *

UNITED STATES PATENT AND TRADEMARK OFFICE
CERTIFICATE OF CORRECTION

PATENT NO. : 5,365,599
DATED : November 15, 1994
INVENTOR(S) : KUNIO SETO, ET AL.

It is certified that error appears in the above-indentified patent and that said Letters Patent is hereby corrected as shown below:

TITLE PAGE

[56] References Cited

FOREIGN PATENT DOCUMENTS, "5315624 12/1974 Japan" and "5341017 2/1975 Japan" should read --53-15624 12/1974 Japan-- and --53-41017 2/1975 Japan--.

COLUMN 1

Line 18, "which" (second occurrence) should be deleted;

Line 19, "processes" should read --processing--; and "processing" should read --which processes--;

Line 33, "of" should read --(see--;

Line 38, "conventional" should read --a conventional--;

Line 42, "character" should read --character,--; and

Line 62, "method" should read --method and system--.

COLUMN 2

Line 57, "respectively" should read --respectively,--.

COLUMN 3

Line 31, "first" should read --first,--;

Line 53, "$y-y_0 \Delta y_0/\Delta x_0 (x-x_0)$" should read
--$y-y_0=\Delta y_0/\Delta x_0 (x-x_0)$--; and

UNITED STATES PATENT AND TRADEMARK OFFICE
CERTIFICATE OF CORRECTION

PATENT NO. : 5,365,599
DATED : November 15, 1994
INVENTOR(S) : KUNIO SETO, ET AL.

It is certified that error appears in the above-indentified patent and that said Letters Patent is hereby corrected as shown below:

COLUMN 3, Cont'd.

Line 60, "$W_0 \cdot y - (y_0 e_0) = \Delta y_0 / \Delta x_0 (x - x_0)$" should read
--$W_0 \cdot y - (y_0 + e_0) = \Delta y_0 / \Delta x_0 (x - x_0)$--.

COLUMN 4

Line 16, "equation" should read --equations--; and

Line 26, "$x'_1 = [(a_0 x_0 - a_1 x_1) - \{(y_0 + e_0) - (y_1 + e_1)\}] / (a_0 - a_1)$" should read --$x'_1 = [(a_0 \cdot x_0 - a_1 \cdot x_1) - \{(y_0 + e_0) - (y_1 + e_1)\}] / (a_0 - a_1)$--.

COLUMN 5

Line 20, "parallel moving" should read --parallel-moving--.

COLUMN 6

Line 11, "moving by" should read --moving, in a predetermined direction corresponding to a direction of the series of coordinate data, by--; and Line 32, "positive." should read --positive or not--.

COLUMN 7

Line 18, "calculating" should read --deriving--;

Line 38, "calculating" should read --deriving--;

UNITED STATES PATENT AND TRADEMARK OFFICE
CERTIFICATE OF CORRECTION

PATENT NO. : 5,365,599
DATED : November 15, 1994
INVENTOR(S) : KUNIO SETO, ET AL.

It is certified that error appears in the above-indentified patent and that said Letters Patent is hereby corrected as shown below:

COLUMN 7, Cont'd.

Line 43, "operation" should read --operational--;
Line 58, "16," should read --6,--; and
Line 64, "contour; $W_0$" should read --contour; wherein $W_0$--.

COLUMN 8

Line 17, "a" should read --the--.

COLUMN 10

Line 21, "parallel moving," should read --parallel-moving,--.

COLUMN 12

Line 17, "wherein" should read --wherein,--.

COLUMN 13

Line 49, "parallel moving," should read --parallel-moving--.

COLUMN 15

Line 2, "edited by said" (second occurrence) should be deleted.

COLUMN 16

Line 45, "for $W_1$" should read --for $W_1$; and--.

UNITED STATES PATENT AND TRADEMARK OFFICE
CERTIFICATE OF CORRECTION

PATENT NO. : 5,365,599
DATED : November 15, 1994
INVENTOR(S) : KUNIO SETO, ET AL.

It is certified that error appears in the above-indentified patent and that said Letters Patent is hereby corrected as shown below:

COLUMN 17

Line 1, "parallel moving," should read --parallel-moving,--.

Signed and Sealed this

Thirteenth Day of June, 1995

Attest:

BRUCE LEHMAN

Attesting Officer        Commissioner of Patents and Trademarks